(12) United States Patent
Nakao

(10) Patent No.: US 12,057,269 B2
(45) Date of Patent: Aug. 6, 2024

(54) FILM CAPACITOR DEVICE

(71) Applicant: KYOCERA Corporation, Kyoto (JP)

(72) Inventor: Yoshihiro Nakao, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 91 days.

(21) Appl. No.: 17/641,567

(22) PCT Filed: Sep. 1, 2020

(86) PCT No.: PCT/JP2020/033123
§ 371 (c)(1),
(2) Date: Mar. 9, 2022

(87) PCT Pub. No.: WO2021/049380
PCT Pub. Date: Mar. 18, 2021

(65) Prior Publication Data
US 2022/0301776 A1    Sep. 22, 2022

(30) Foreign Application Priority Data

Sep. 13, 2019 (JP) .................................. 2019-167541
Jul. 13, 2020 (JP) .................................. 2020-120219

(51) Int. Cl.
| H01G 4/232 | (2006.01) |
| H01G 4/012 | (2006.01) |
| H01G 4/30  | (2006.01) |
| H01G 4/14  | (2006.01) |

(52) U.S. Cl.
CPC ............. *H01G 4/232* (2013.01); *H01G 4/012* (2013.01); *H01G 4/30* (2013.01); *H01G 4/14* (2013.01)

(58) Field of Classification Search
CPC ............ H01G 4/14; H01G 4/30; H01G 4/012; H01G 4/232
See application file for complete search history.

(56) References Cited

U.S. PATENT DOCUMENTS

| 4,142,222 A * | 2/1979 | Kotschy ................. H01G 4/015 361/273 |
| 2014/0301019 A1 | 10/2014 | Zhu et al. |
| 2016/0086727 A1 * | 3/2016 | Choi ................... H01F 17/0013 336/200 |

FOREIGN PATENT DOCUMENTS

| EP | 0371319 A2 * | 6/1990 | |
| GB | 2094061 A * | 9/1982 | ............. H01G 13/00 |
| JP | 10097942 A * | 4/1998 | |
| JP | 2003-257783 A | 9/2003 | |
| JP | 2008205135 A * | 9/2008 | |

(Continued)

*Primary Examiner* — David M Sinclair
(74) *Attorney, Agent, or Firm* — Volpe Koenig

(57) ABSTRACT

A stacked film capacitor device has less capacitance loss. The film capacitor device includes a film stack with metal layers including adjacent metal layers in 180° opposite orientations in a direction in which the metal layers extend continuously, and a first metal electrode and a second metal electrode on a pair of end faces of the film stack. At least one of a pair of end faces of the film stack in y-direction includes a recess continuously extending in a stacking direction and separating the film stack from the first metal electrode. The recess electrically insulates the metal layers serving as internal electrodes from a metal-sprayed electrode serving as an external electrode.

2 Claims, 11 Drawing Sheets

(56) References Cited

FOREIGN PATENT DOCUMENTS

| JP | 5984097 B | 9/2016 | | |
|----|-----------|--------|---|---|
| WO | WO-2020211975 A1 | * | 10/2020 | ............... H01G 4/18 |

* cited by examiner

US 12,057,269 B2

FILM CAPACITOR DEVICE

FIELD

The present disclosure relates to a film capacitor device.

BACKGROUND

A film capacitor includes either a wound body of or a stack of metalized films, which are metal films to be an electrode formed by vapor deposition, on the surface of a dielectric film of, for example, a polypropylene resin.

When a stacked film capacitor is cut into an appropriate size (capacity) from a stack of metalized films, the metal films are cut together with the dielectric film. The metal films can come in contact with one another at the cut surface (end face) and may cause an insulation failure.

In a film capacitor device (core) described in Patent Literature 1, metalized films have exposed film surface portions called insulation margins including no metal film and including grooves or strips with a uniform width (gap strips). These surface portions may include bends that extend obliquely to the direction parallel to the direction in which the insulation margins extend to improve the withstanding voltage (withstanding pressure) at the cut surface of the stack (device).

CITATION LIST

Patent Literature

Patent Literature 1: Japanese Patent No. 5984097

BRIEF SUMMARY

However, the stacked film capacitor described in Patent Literature 1 may have great capacitance loss at around the cut surface of the film stack. A stacked film capacitor device with less capacitance loss is awaited.

Solution to Problem

A film capacitor device according to an aspect of the present disclosure includes a film stack being rectangular, a first metal electrode, and a second metal electrode. The film stack includes a plurality of dielectric films being stacked. Each of the plurality of dielectric films includes a metal layer on a surface of the dielectric film and includes, at an edge of the surface of the dielectric film in a first direction, an edge insulation area continuously extending in a second direction perpendicular to the first direction. The plurality of dielectric films include adjacent dielectric films in 180° opposite orientations in the first direction on the surface and alternate dielectric films having the edge insulation areas overlapping in a plan view. The first metal electrode and the second metal electrode are on a pair of end faces of the film stack in the first direction. Each of the plurality of dielectric films including the metal layer electrically connected at least to the first metal electrode includes a plurality of metal strips extending in the first direction and an insulation margin extending in the first direction as a groove between adjacent metal strips of the plurality of metal strips.

In the film capacitor device according to the aspect of the present disclosure, at least one of a pair of end faces of the film stack in the second direction includes a recess continuously extending in a direction in which the plurality of dielectric films are stacked and separating the film stack from the first metal electrode.

Advantageous Effects

The stacked film capacitor device according to the above aspect of the present disclosure has less capacitance loss in a cut portion of the film stack cut in a predetermined direction.

BRIEF DESCRIPTION OF DRAWINGS

The objects, features, and advantages of the present invention will become more apparent from the following detailed description and the drawings.

DETAILED DESCRIPTION

A film capacitor device according to one or more embodiments will now be described with reference to the drawings.

Figure 1A:
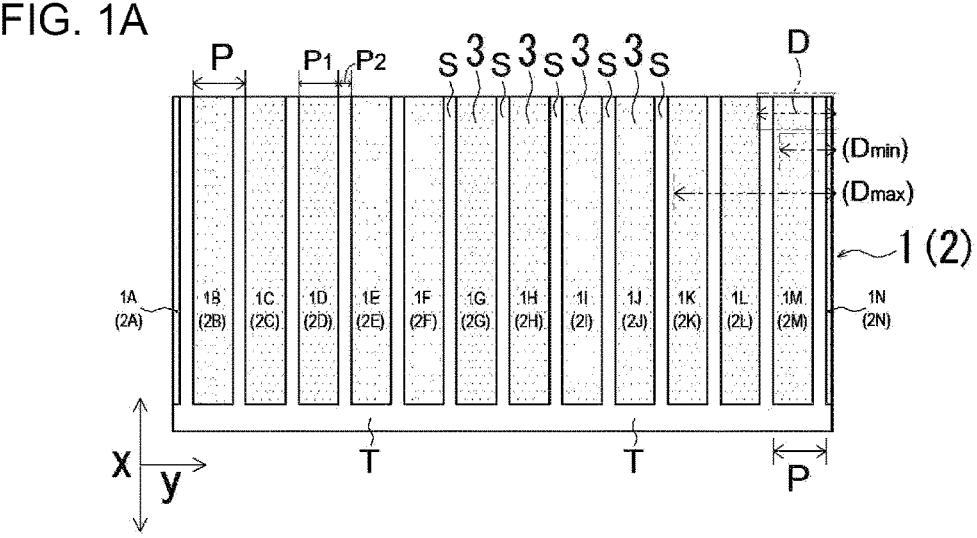
FIG. 1A is a plan view of a metalized dielectric film showing the structure of a film capacitor device according to an embodiment.

As shown in FIG. 1A, a film capacitor device 10 according to an embodiment includes multiple dielectric films 1 and dielectric films 2 stacked alternately on one another. Each of the dielectric films 1 and 2 includes, on its surface, multiple metal strips (films) 3 continuously extending in a first direction (x-direction in the figure).

Each of the metal strips 3 serves as an internal electrode in the stacked capacitor. The dielectric films 1 and the dielectric films 2 have the same structures in their remaining portions as in the portions shown in FIG. 1B with the difference between the dielectric films 1 and 2 being their stacking direction. To indicate the orientations in the stacked structure, the metal strips 3 included in the dielectric film 1 are denoted with numerals 1A to 1N in this order from an end of the film, and the metal strips 3 in the dielectric film 2 are denoted with numerals 2A to 2N in this order from an end of the film as shown in FIGS. 1A and 1C.

In the figures, the direction in which the metal strips 3 parallel to each other extend continuously is referred to as the first direction (x-direction), and the direction in which the metal strips 3 align in parallel (y-direction perpendicular to x-direction) is referred to as a second direction. The dielectric films 1 and 2 are stacked on one another in a third direction (z-direction in the figures) perpendicular to the first and second directions. The obtained stack, or a film stack 4, will be described later in detail.

The metal strips 3 on the surface of each of the dielectric films 1 and 2 are formed by depositing metal on a base film (substrate) by vapor deposition. Each of the dielectric films 1 and 2 has surface portions as grooves, each exposed between the metal strips 3 adjacent to each other in y-direction (hereafter, insulation margins S), which are also referred to as small margins. The metal strips 3 are thus separate and are electrically insulated from each other.

Each of the insulation margins S (small margins) is continuous with an insulating strip area T at an end of the dielectric film in the first direction (x-direction). The insulating strip area T, which is also referred to as a large margin, extends continuously in the second direction (y-direction). The interval (pitch P) between the insulation margins S is equal to the sum of a width P1 of one metal strip 3 in y-direction and a width P2 of one insulation margin S in y-direction (P=P1+P2).

The dielectric films 1 and 2 included in the film capacitor device 10 may be formed from an organic resin material such as polypropylene, polyethylene terephthalate, polyarylate, or cyclic olefin polymer.

Figure 1B:
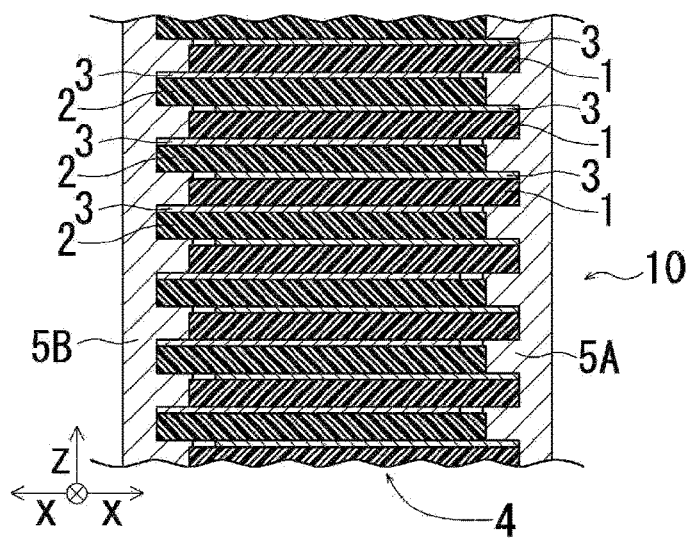
FIG. 1B is a schematic cross-sectional view of the device showing stacked films.
Figure 1C:
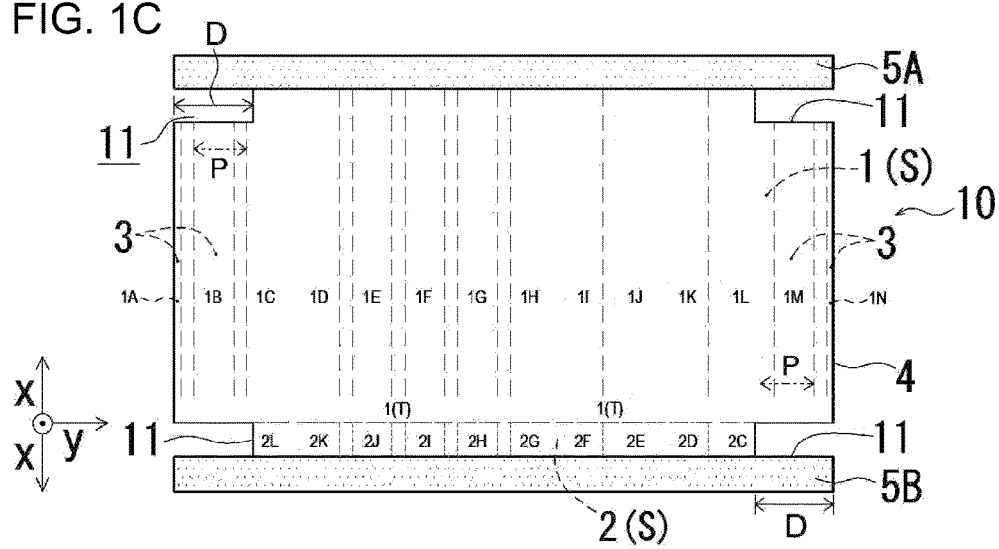
FIG. 1C is a plan view of the film capacitor device from above.

As shown in FIG. 1B, the film stack 4 includes the dielectric films 1 and 2 that are adjacent to each other in the vertical direction (z-direction) in the figure and are stacked alternately in 180° opposite orientations in x-direction. More specifically, the dielectric films 1 and 2 are stacked on one another to have their insulating strip areas T each located at an end (edge) of the corresponding dielectric film 1 or 2 to be alternately opposite to each other in x-direction.

The film stack 4 includes, on its two ends in x-direction, metal electrodes that are formed by metal thermal spraying (hereafter, metal-sprayed electrodes). In the FIG. 5A indicates the metal-sprayed electrode at one end in x-direction (first metal electrode), and 5B indicates the metal-sprayed electrode at the other end in x-direction (second metal electrode). These electrodes are simply at different locations and have the same structure.

The film capacitor device 10 according to the embodiment including the metal-sprayed electrodes 5A and 5B has, at its two ends in y-direction (second direction), recesses 11 that separate the metal strips 3 (internal electrodes) from the metal-sprayed electrodes 5A and 5B (external electrodes) as shown in FIG. 1C. In the present embodiment, the film capacitor device 10 has four recesses 11 in total, which are two recesses at one end of the film stack 4 in x-direction and two recesses at the other end.

The recesses 11 continuously extend in the stacking direction of the film (z-direction) between the metal-sprayed electrode 5A or 5B and the film stack 4 or in an area including an interface (boundary) between the metal-sprayed electrode 5A or 5B and the film stack 4. Each recess 11 is open to an end face of the film stack 4 in y-direction and has a depth D (y-direction) from the end face in y-direction greater than the pitch P, which is the interval between the insulation margins S as described above.

More specifically, the film capacitor device 10 has the recesses 11 that separate and electrically insulate one or two of the metal strips 3 at each end of the stacked dielectric film 1 in y-direction from the metal-sprayed electrodes 5A and 5B in FIG. 1C. For example, the separated and electrically insulated metal strips 3 may be at locations 1A and 1B at the left end in the figure and at locations 1N and 1M at the right end in the figure.

In the same manner, the recesses 11 separate and electrically insulate one or two metal strips 3 located at each end of the stacked dielectric film 2 in y-direction from the metal-sprayed electrodes 5A and 5B in FIG. 1C. For example, the separated and electrically insulated metal strips 3 may be at locations 2N and 2M at the left end not shown in the figure and at locations 2A and 2B at the right end also not shown in the figure.

In other words, a film capacitor including the above film capacitor device 10 may include the metal strips 3 that linearly extend in x-direction, thus including fewer metal strips 3 to be cut or insulated at each end in y-direction. The film capacitor according to the embodiment thus has less capacitance loss at around the cut surface of the stack (each end in y-direction) than a known film capacitor including a device with oblique insulation margins (refer to Patent Literature 1).

One or two of the metal strips 3 at each end in y-direction may be cut to the depth D from the end face in y-direction. The resultant recesses 11 may be sufficient for insulation. More specifically, the recesses 11 may have the depth D about one time (Dmin in the figure) to three times (Dmax in the figure) the pitch P of the insulation margin S as shown in the upper-right area of FIG. 1A. At least one of the metal strips 3 at each end in y-direction may thus be reliably insulated, independently of the width of the metal strip 3 located at the end in y-direction, or independently of the width P1 in y-direction of 1A, 2A, 1N, and 2N that varies depending on the cutting position of the film stack 4 in this example.

The locations of the recesses 11 in x-direction (first direction) (FIG. 2A) will be described later, together with the internal structure of the film stack 4.

FIGS. 5 to 8 are schematic views showing processes for manufacturing a film capacitor device according to one or more embodiments. In FIGS. 5 to 8 showing the structure in a second embodiment and in FIGS. 9 and 10 showing structures in modifications, the direction in which the metal strips 3 parallel to each other extend continuously is referred to as the first direction (x-direction in the figures), the direction in which the metal strips 3 align in parallel (y-direction perpendicular to x-direction) is referred to as the second direction, and the film stacking direction perpendicular to the first and second directions is referred to as the third direction (z-direction in the figures) as in FIG. 1.

Figure 5:
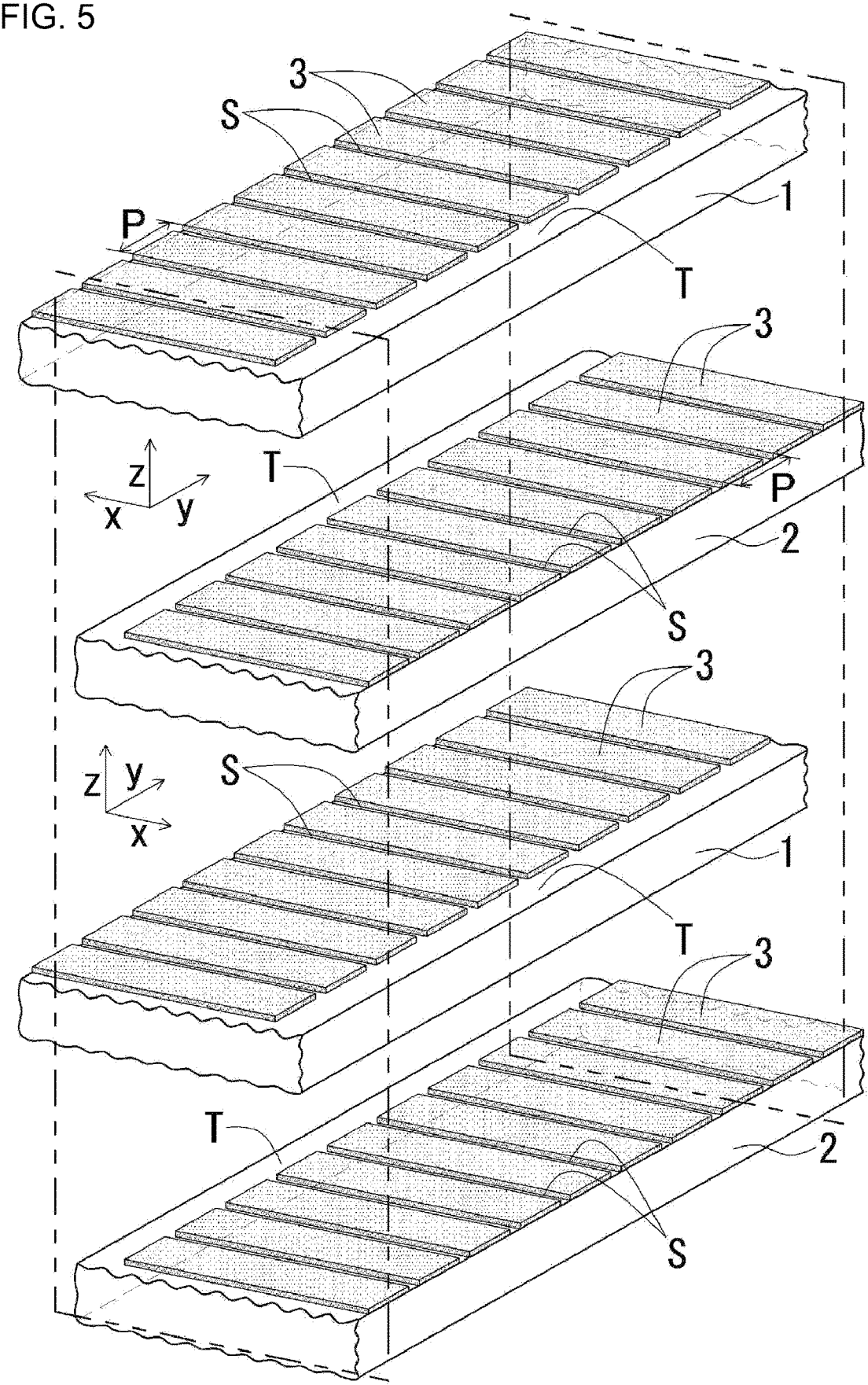
FIG. 5 is an exploded perspective view describing a method for manufacturing a film capacitor device according to an embodiment.

The processes for manufacturing a stacked film capacitor device 70 will now be described. As shown in FIG. 5, multiple dielectric films 1 and multiple dielectric films 2 each including multiple metal strips 3 continuously extending in x-direction on its surface are first stacked alternately in opposite orientations in x-direction. More specifically, the stacked dielectric films 1 and 2 include adjacent dielectric films in 180° opposite orientations in x-direction (first direction) and alternate dielectric films having their insulating strip areas T overlapping in a plan view.

As described above, the dielectric films 1 and the dielectric films 2 have the same structures except for their orientations in x-direction. The elongated dielectric films 1 and 2 may be stacked with a known method, such as winding the films around a circular cylinder or a polygonal cylinder. The imaginary lines (two-dot chain lines) in FIG. 5 indicate the lines along which the films wound around, for example, a cylinder are cut.

Figure 6:
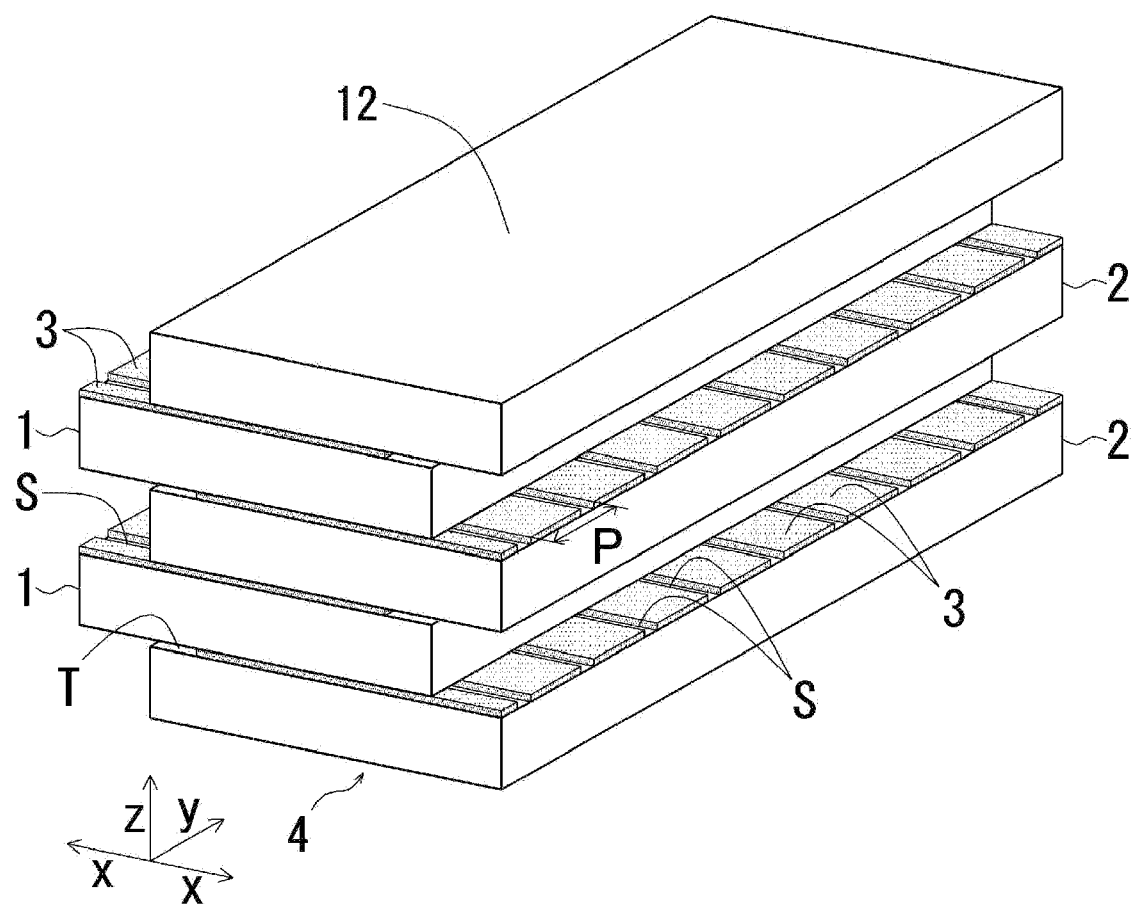
FIG. 6 is an external perspective view of the device including the stacked films.

FIG. 6 is a view of the film stack 4 cut into a predetermined length as viewed from the cut surface (end face in y-direction). As shown in FIG. 6, the vertically adjacent dielectric films 1 and 2 are slightly displaced (offset) from each other in the continuously extending direction of the metal strips 3 (x-direction) in the stacked structure. Each metal strip 3 thus has an end exposed at one end face of the film stack 4 in x-direction and another end adjacent to the other end face of the film stack 4 in x-direction.

The film stack 4 in the embodiment includes an insulating layer 12 on its upper surface. The insulating layer 12 is formed from, for example, a dielectric film with no metal strips 3 and serving as a protective layer (film) for the stack. The insulating layer 12 may be eliminated.

Figure 7:
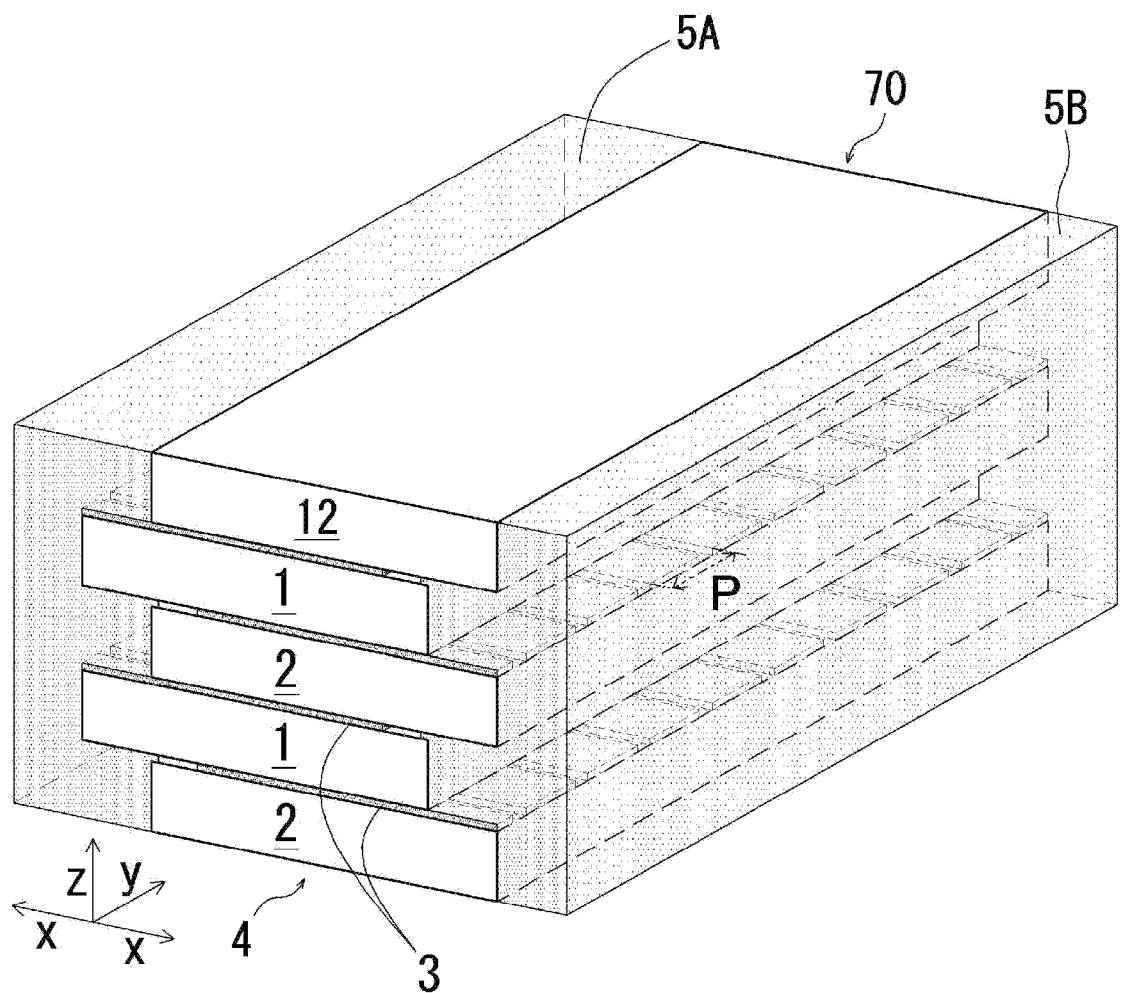
FIG. 7 is an external perspective view of the device including metal electrodes formed by thermal spraying.

As shown in FIG. 7, the first metal electrode (metal-sprayed electrode 5A) and the second metal electrode (metal-sprayed electrode 5B) are then formed by metal thermal spraying onto the two end faces of the film stack 4 in x-direction. The metal strips 3 have their ends exposed at the corresponding end faces as described above. The metal strips 3 on the dielectric films 1 and 2 are thus electrically connected to the corresponding metal-sprayed electrodes on the right and left in the figure (x-direction) to function as internal electrodes of the device.

In the film capacitor device 70 according to a second embodiment, the recesses 11 (having the depth D in y-direction) are formed in the two end faces of the film stack 4 in y-direction, which are the cut surfaces of the stack (wound body). The recesses 11 are open to the end faces in y-direction and separate the metal strips 3 (internal electrodes) from the metal-sprayed electrodes 5A and 5B (external electrodes). In the present embodiment as well, the film capacitor device 70 includes four recesses 11 in total, which are two recesses at one end of the film stack 4 in y-direction and two recesses at the other end.

The recesses 11 may be continuously formed in the stacking direction (z-direction) by, for example, machining or cutting. The recesses 11 may be, for example, cutouts, slits, or notches.

The recesses 11 may have the depth D in y-direction at least greater than the pitch P, which is the sum of the width of one metal strip 3 and the width of one insulation margin S. More specifically, the depth may be about one to three times the pitch P to insulate one or two metal strips 3 at each end in y-direction. The depth is to be less than or equal to three times the pitch P not to increase the capacitance loss at the ends.

Figure 8:
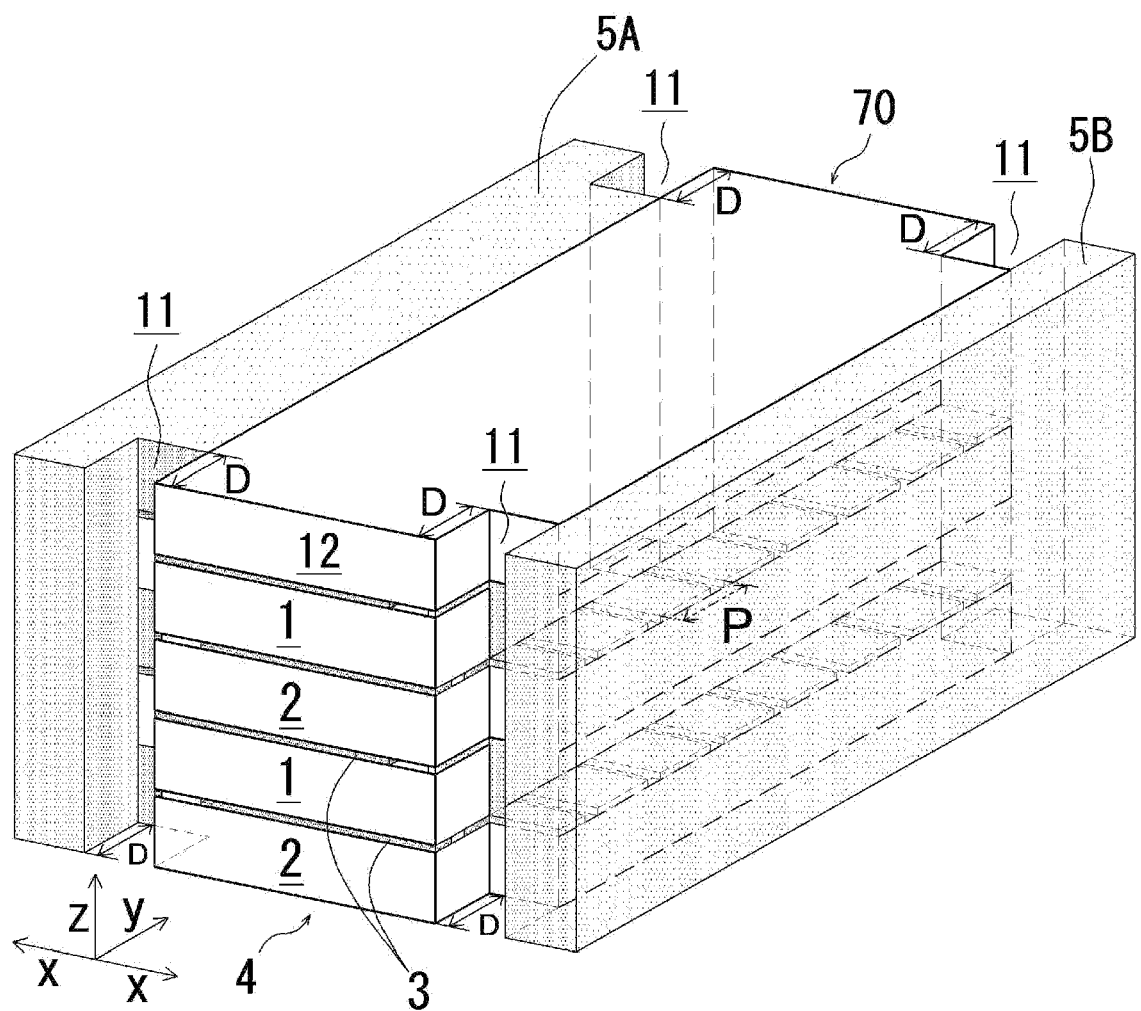
FIG. 8 is an external perspective view of the device having recesses for insulation showing the locations of the recesses.
Figure 9:
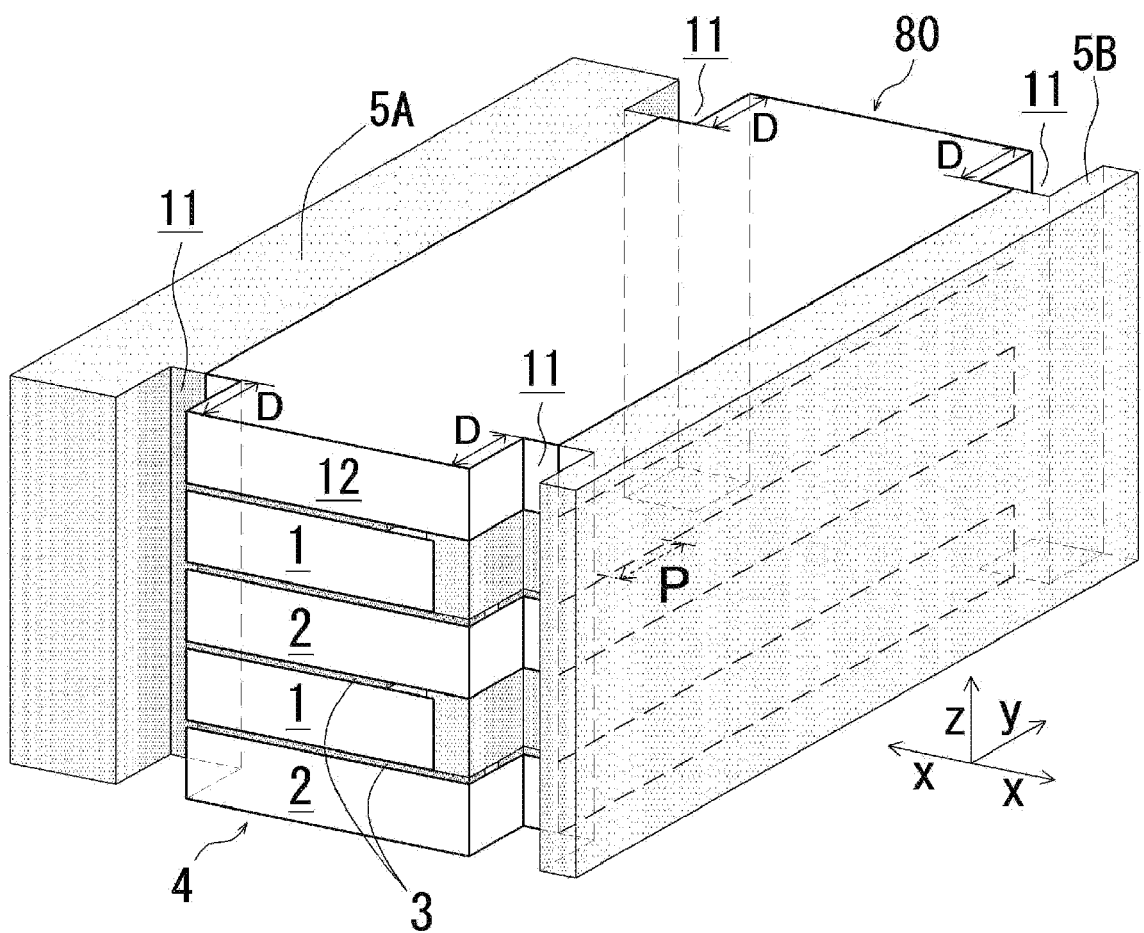
FIG. 9 is a view of a device according to another embodiment having recesses for insulation at different locations.
Figure 10:
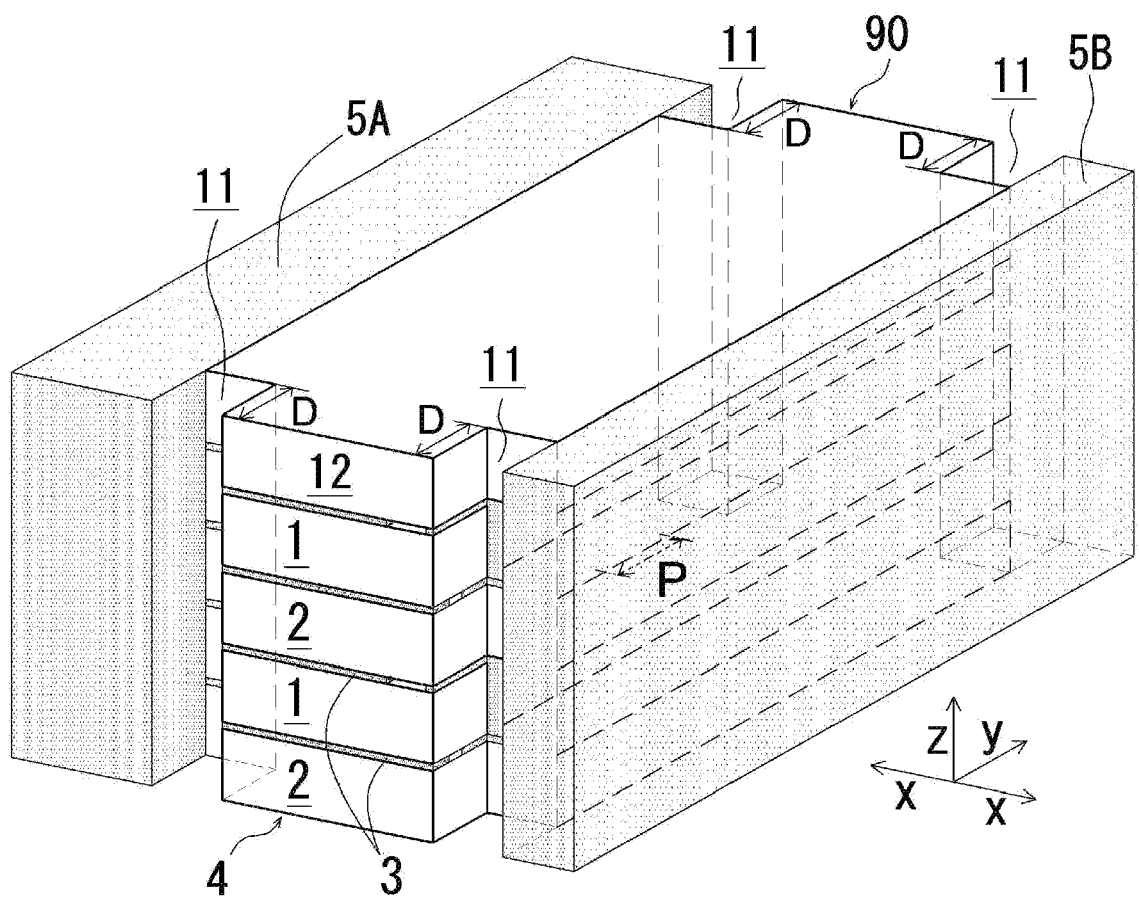
FIG. 10 is a view of a device according to another embodiment having recesses for insulation at different locations.

The locations of the recesses 11 in x-direction may be between the film stack 4 and the metal-sprayed electrode 5A or 5B as in the film capacitor device 70 shown in FIG. 8 or in an area including the interface (boundary) between the metal-sprayed electrode 5A or 5B and the film stack 4 as in a film capacitor device 80 shown in FIG. 9. In another embodiment, the recesses 11 at the two ends in x-direction may be located in the film stack 4 adjacent to the interface (boundary) between the metal-sprayed electrode 5A or 5B and the film stack 4 as in a film capacitor device 90 shown in FIG. 10.

Figure 2A:
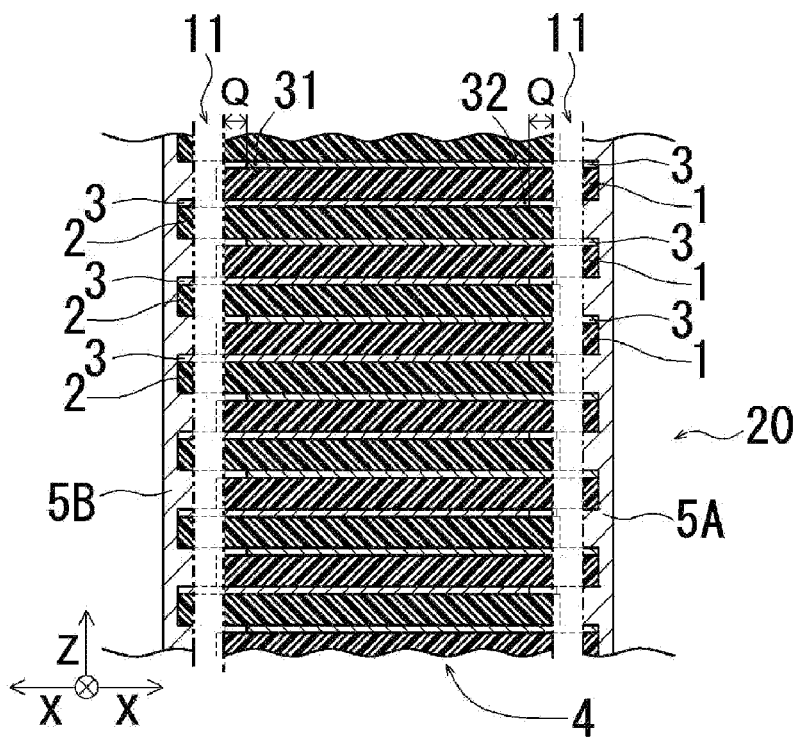
FIG. 2A is a cross-sectional view of a film capacitor device showing the locations of recesses.

Any of the above structures may produce the same advantageous effects. The metal strips 3 on the dielectric films 1 and the metal strips 3 on the dielectric films 2 have their ends exposed at the corresponding inner surfaces (inner wall surfaces) of the recesses 11. As shown in FIG. 2A, the metal strips 3 on the dielectric films 1 have the other ends 31 away by a distance Q in x-direction from the corresponding recess 11, and the metal strips 3 on the dielectric films 2 have the other ends 32 away by the distance Q in x-direction from the corresponding recess 11. The ends 31 and 32 are not exposed at the inner surfaces of the corresponding recesses 11.

Figure 2B:
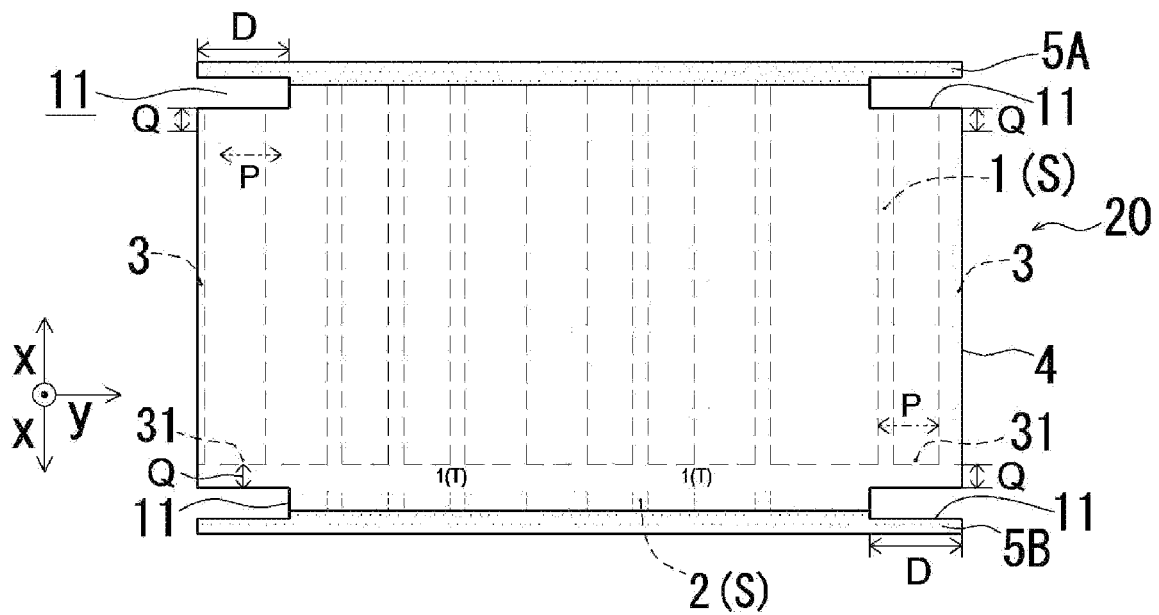
FIG. 2B is a plan view of the film capacitor device showing the locations of the recesses.

FIG. 2B is a plan view of a film capacitor device 20 from above showing the locations of the recesses 11 in x-direction. As shown in the lower half of the figure, the ends 31 of the metal strips 3 on the dielectric film 1 are located inside the film stack 4 in x-direction. The above recesses 11 are thus located outward from the ends 31 with the distance Q (adjacent to the metal-sprayed electrode 5B). This structure provides reliable electrical insulation from the internal electrodes (metal strips 3). The distance Q from the ends 31 or 32 of the metal strips 3 may be at least 200 μm.

Figure 3A:
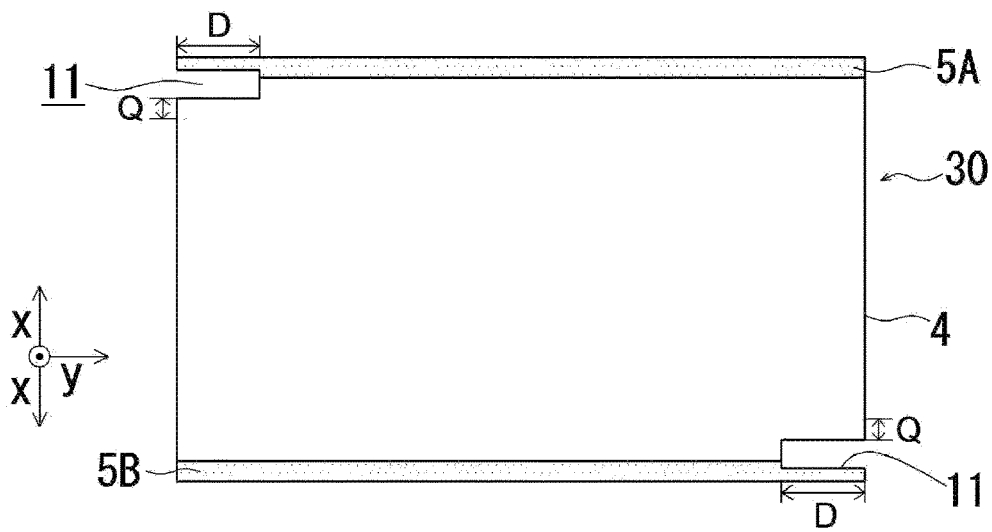
FIG. 3A is a plan view of a film capacitor device according to another embodiment showing the locations of recesses.
Figure 3B:
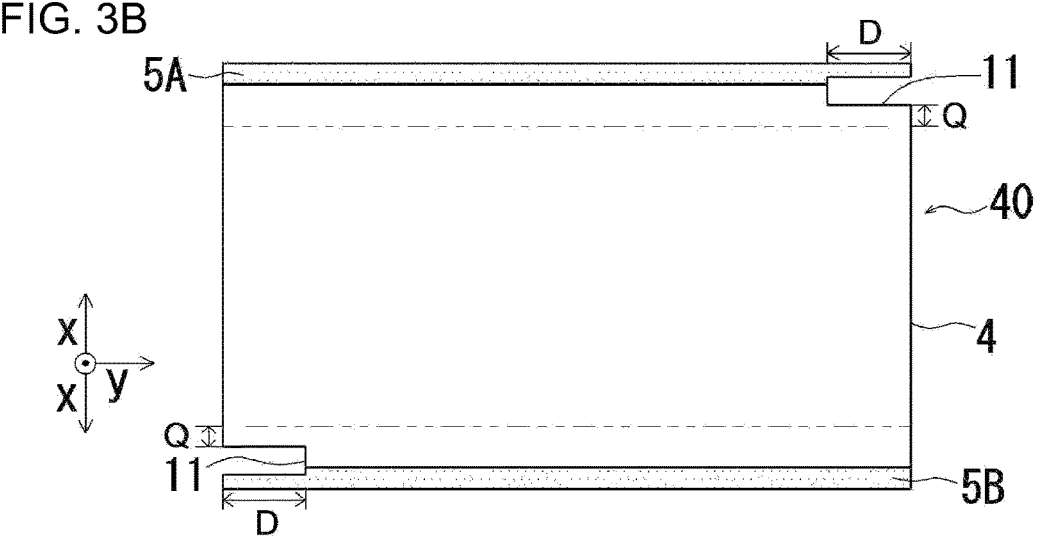
FIG. 3B is a plan view of a film capacitor device according to another embodiment showing the locations of recesses.
Figure 3C:
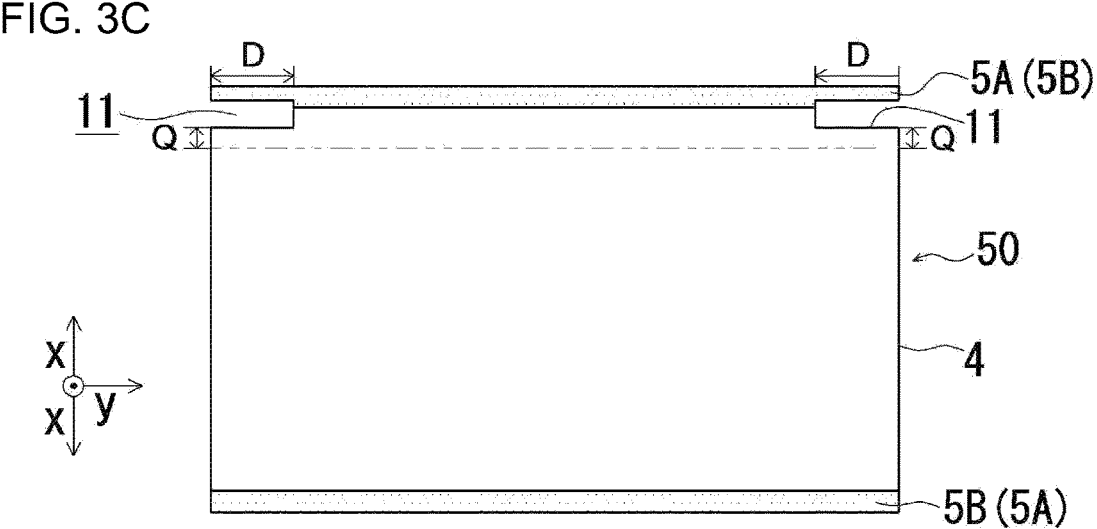
FIG. 3C is a plan view of a film capacitor device according to another embodiment showing the locations of recesses.

In each of the embodiments described with reference to FIGS. 1A to 2B and 8 to 10, the structure includes the four recesses 11 in total, which are two recesses at each end in x-direction and in y-direction. In other embodiments, the structure may include two recesses 11 in total as shown in FIGS. 3A to 3C, which are the recesses between the film stack 4 and the metal-sprayed electrode 5A or 5B at each end in y-direction. The two recesses 11 may be located at different ends (corners) in x-direction diagonally from each other on an xy plane of a film capacitor device 30 or may be located at ends (corners) in y-direction at the same end in x-direction. The structure according to another embodiment (not shown) may include three recesses 11 in total, which are two recesses between the film stack 4 and the metal-sprayed electrode 5A at each end in y-direction and one recess between the film stack 4 and the metal-sprayed electrode 5B at one end in y-direction.

Figure 4A:
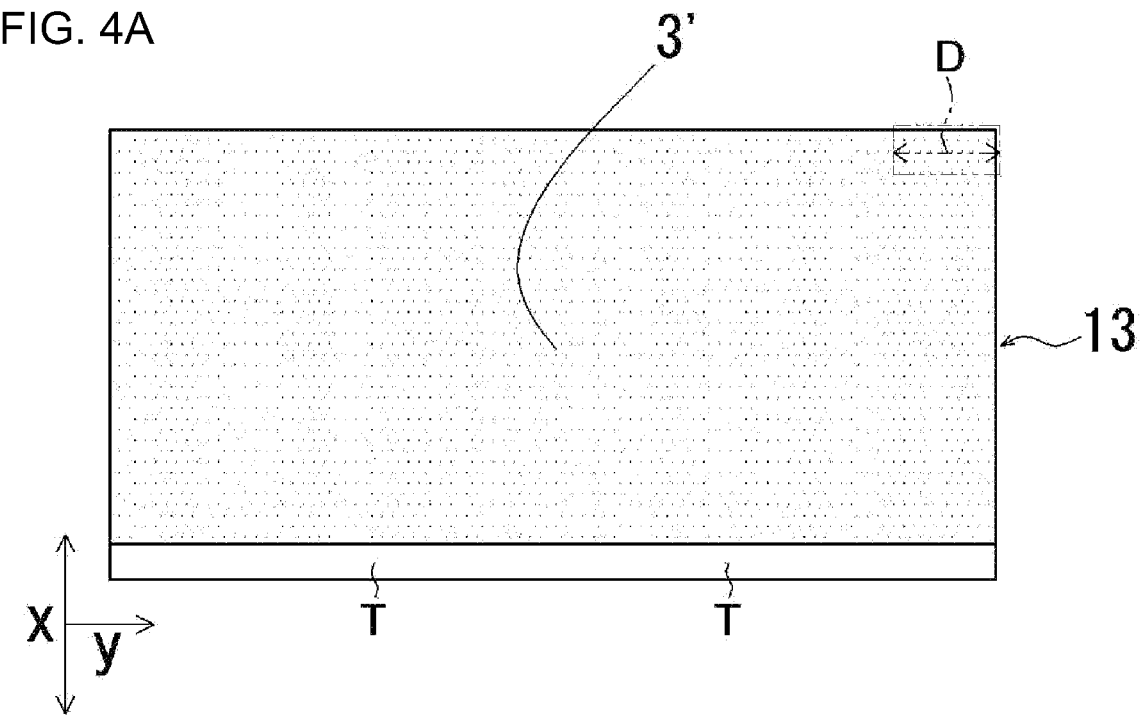
FIG. 4A is a plan view of a dielectric film including a metal layer in a different pattern.
Figure 4B:
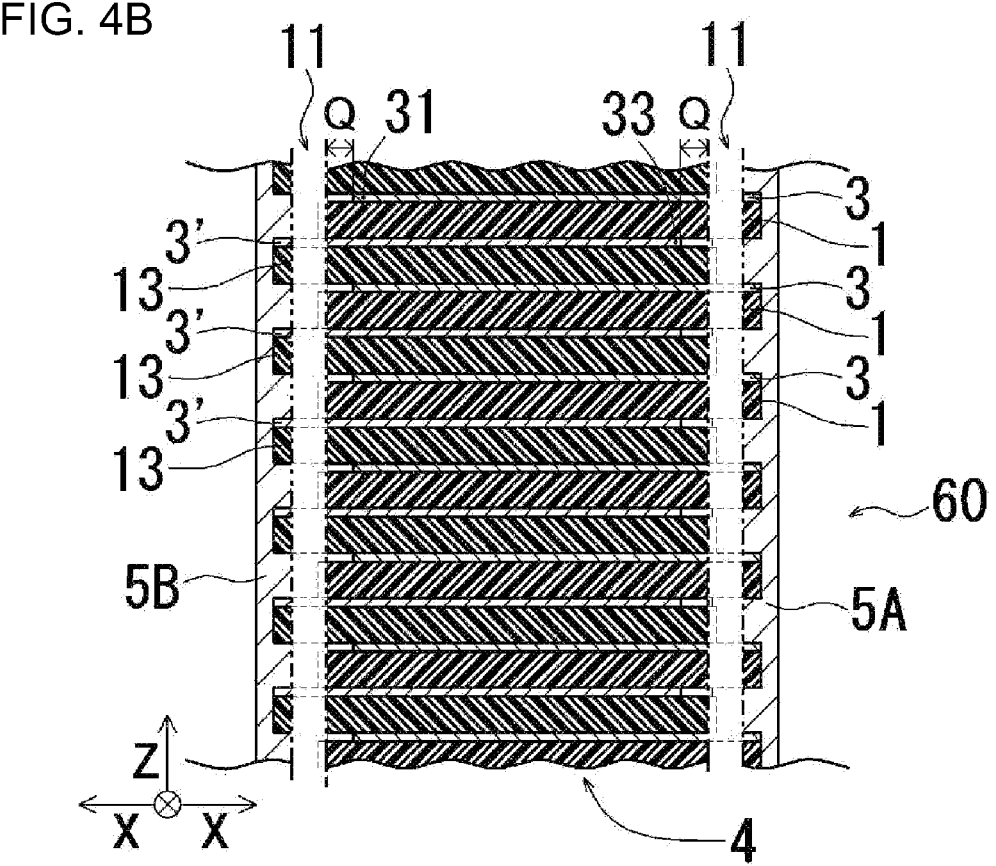
FIG. 4B is a schematic cross-sectional view of a film stack including the dielectric films including the metal layers in the different pattern.

As shown in FIG. 4B, the film stack 4 may include an alternate stack of the dielectric films 1 including the metal strips 3 separate from each other by the insulation margins S (refer to FIG. 1A) and dielectric films 13 each including an entire metal layer 3' with no insulation margin (refer to FIG. 4A), which is a solid pattern. In this case, the recesses 11 may be located at each end (corner) in y-direction on the right in x-direction to have gaps between the metal-sprayed electrode 5A and ends 33 of the entire metal layers 3' as shown in FIG. 4B. In FIG. 4B, each of the metal strips 3 on the dielectric films 1 is electrically connected to the metal-sprayed electrode 5A (first metal electrode) on the right (x-direction) in the figure, with the entire metal layers 3' on the dielectric films 13 connected to the metal-sprayed electrode 5B (second metal electrode).

As described above, the number of recesses 11 and their locations may be variously determined depending on the location and the arrangement pattern of each metal film that serves as an internal electrode, as in the film capacitor devices 30, 40, and 50 in FIGS. 3A to 3C and a film capacitor device 60 in FIGS. 4A and 4B. A film capacitor using the film capacitor device 30, 40, 50, or 60 that differ in the number of recesses 11 and their locations may produce the same advantageous effects and have functions as a film capacitor including the above film capacitor device 10, 20, 70, 80, or 90.

Figure 11:
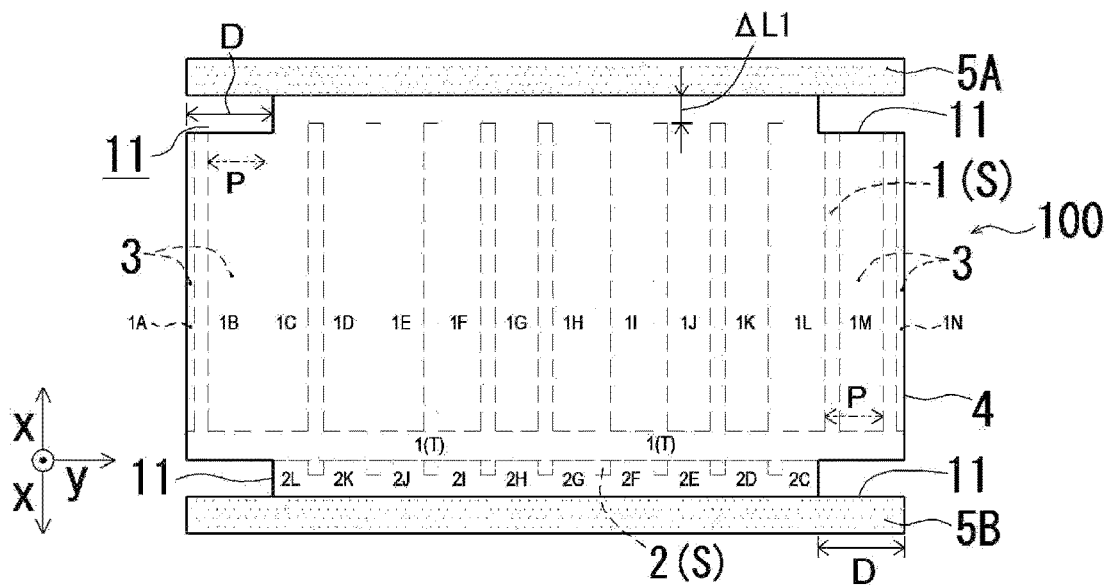
FIG. 11 is a plan view of a film capacitor device according to another embodiment of the present disclosure.

FIG. 11 is a plan view of a film capacitor device 100 according to another embodiment of the present disclosure. The components corresponding to those in the above embodiments are denoted with the same reference numerals. The film capacitor device 100 according to the present embodiment includes the film stack 4 being rectangular, and the metal-sprayed electrodes 5A and 5B. The film stack 4 includes the dielectric films 1 and 2 being stacked. Each of the dielectric films 1 and 2 includes the metal strips 3 on a surface of the dielectric film 1 or 2 and includes, at an edge of the surface of the dielectric film in the first direction (x-direction), the insulating strip area T continuously extending in the second direction (y-direction) perpendicular to the first direction (x-direction). The dielectric films 1 and 2 include adjacent dielectric films in 180° opposite orientations in the first direction (x-direction) on the surface and alternate dielectric films having the insulating strip areas T overlapping in a plan view. The metal-sprayed electrode 5A (first metal electrode) and the metal-sprayed electrode 5B (second metal electrode) are on a pair of end faces of the film stack 4 in the first direction (x-direction). The dielectric films 1 and 2 included in the film capacitor device 100 may be formed from an organic resin material such as polypropylene, polyethylene terephthalate, polyarylate, or cyclic olefin polymer, in the same manner as in the above embodiments.

Each of the dielectric films 1 and 2 including the metal layer at least partially electrically connected to the metal-sprayed electrodes 5A and 5B includes multiple metal strips 3 extending in the first direction (x-direction) and the insulation margins S extending in the first direction (x-direction) as grooves between the adjacent metal strips 3. The film stack 4 has the recesses 11 continuously extending in the film stacking direction (z-direction) on a pair of end faces of the film stack 4 in the second direction (y-direction). The recesses 11 separate the film stack 4 from the metal-sprayed electrodes 5A and 5B.

In this film capacitor device 100, the insulation margins S between the metal strips 3 are away from the metal-sprayed electrode 5A or 5B in the first direction (x-direction) by a distance $\Delta L1$. The insulation margins S may be discontinuous with the metal-sprayed electrode 5A or 5B and disconnected from the metal-sprayed electrode 5A or 5B with the recesses 11 in the area in which the metal strips 3 and the metal-sprayed electrode 5A or 5B are separate from each other, or more specifically, in the depth D in the second direction (y-direction) of the recesses 11. In this case, the metal strips 3 at 1C, 1D to 1K, and 1L are connected to one another in the area in which the insulation margins S are away from the metal-sprayed electrode 5A by the distance $\Delta L1$, and the metal strips 3 at 2C, 2D to 2K, and 2L are connected to one another in the area in which the insulation margins S are away from the metal-sprayed electrode 5B by the distance $\Delta L1$, as shown in FIG. 11. More specifically, the metal strips 3 in an intermediate portion between the pair of the recesses 11 in y-direction are at least partially connected to the metal-sprayed electrode 5A or 5B. The metal strips 3 in the intermediate portion are thus commonly connected to the metal-sprayed electrode 5A or 5B. This structure prevents the entire capacitance from decreasing when a connection failure occurs between one or more metal strips 3 in the intermediate portion and the metal-sprayed electrode 5A or 5B.

Figure 12:
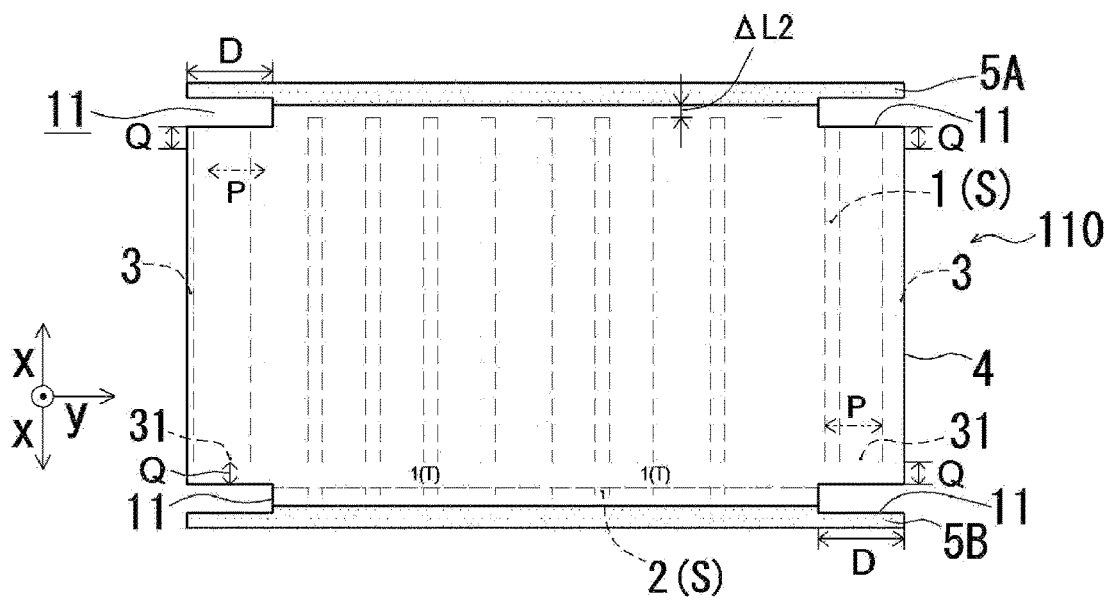
FIG. 12 is a plan view of a film capacitor device according to still another embodiment of the present disclosure.

In another embodiment shown in FIG. 12, a film capacitor device 110 includes the recesses 11 in the area including the interface (boundary) between the metal-sprayed electrode 5A or 5B and the film stack 4. In the film capacitor device 110, the metal strips 3 at 1C, 1D to 1K, and 1L are connected to one another in the area in which the insulation margins S are away from the metal-sprayed electrode 5A by the distance $\Delta L2$, and the metal strips 3 at 2C, 2D to 2K, and 2L are connected to one another in the area in which the insulation margins S are away from the metal-sprayed electrode 5B by the distance $\Delta L2$, in the same manner as in the embodiment shown in FIG. 11. More specifically, the metal strips 3 in the intermediate portion between the pair of the recesses 11 in y-direction are at least partially electrically connected to the metal-sprayed electrode 5A or 5B. This structure may thus prevent the entire capacitance from decreasing when a connection failure occurs between one or more metal strips 3 in the intermediate portion and the metal-sprayed electrode 5A or 5B.

In the film capacitor device according to each of the above embodiments, the recesses 11 separate and electrically insulate one or two of the metal strips 3 at each end in y-direction (second direction) from the metal-sprayed electrode 5A or 5B. This structure reduces the capacitance loss at around the cut surface of the stack (each end in y-direction) as compared with a known film capacitor including a device with oblique insulation margins. In other words, the film capacitor device according to each of the above embodiments may be used to form a stacked film capacitor with less capacitance loss at the cut surface.

The present invention may be embodied in various forms without departing from the spirit or the main features of the present invention. The embodiments described above are thus merely illustrative in all respects. The scope of the present invention is defined not by the description given above but by the claims. Any modifications and alterations contained in the claims fall within the scope of the present invention.

REFERENCE SIGNS LIST 1, 2, 13 dielectric film
3 metal strip
4 film stack
5A, 5B metal-sprayed electrode (metal electrode)
10 film capacitor device
11 recess
S insulation margin
T insulating strip area

The invention claimed is:
1. A film capacitor device, comprising:
a film stack being rectangular and including a plurality of dielectric films being stacked, each of the plurality of dielectric films including a metal layer on a surface of the dielectric film and including, at an edge of the surface of the dielectric film in a first direction, edge insulation areas continuously extending in a second direction perpendicular to the first direction, the plurality of dielectric films including adjacent dielectric films in 180° opposite orientations in the first direction on the surface and alternate dielectric films having the edge insulation areas overlapping in a plan view, wherein alternating dielectric films of the plurality of stacked dielectric films are offset in the first direction;

a first metal electrode; and a second metal electrode, the first metal electrode and the second metal electrode being on a pair of end faces of the film stack in the first direction, wherein each of the plurality of dielectric films including the metal layer electrically connected at least to the first metal electrode includes a plurality of metal strips extending in the first direction and an insulation margin extending in the first direction as a groove between adjacent metal strips of the plurality of metal strips, at least two of the plurality of metal strips are commonly connected to the first metal electrode by a common electrode, and at least one of a pair of end faces of the film stack in the second direction includes a recess continuously extending in a direction in which the plurality of dielectric films are stacked and separating the film stack from the first metal electrode.

2. The film capacitor device according to claim 1, wherein the recess has a depth in the second direction greater than a width of each of the plurality of metal strips in the second direction.

* * * * *